US012730786B2

(12) United States Patent
Mahanta et al.

(10) Patent No.: US 12,730,786 B2
(45) **Date of Patent: *Sep. 8, 2026**

(54) DE-DUPLICATING TRANSACTION RECORDS USING TARGETED FUZZY MATCHING

(71) Applicant: Coupa Software Incorporated, San Mateo, CA (US)

(72) Inventors: Jyotirmaya Mahanta, Pune (IN); Ankit Narang, Pune (IN); Shoan Jain, Berkeley, CA (US); Prasanna Kumar, Hyderabad (IN)

(73) Assignee: Coupa Software Incorporated, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/093,471

(22) Filed: Mar. 28, 2025

(65) Prior Publication Data

US 2025/0252087 A1 Aug. 7, 2025

Related U.S. Application Data

(63) Continuation of application No. 18/427,309, filed on Jan. 30, 2024, now Pat. No. 12,287,767.

(Continued)

(51) Int. Cl.

| | |
|---|---|
| ***G06F 16/215*** | (2019.01) |
| ***G06F 16/901*** | (2019.01) |

(Continued)

(52) U.S. Cl.

CPC ........ *G06F 16/215* (2019.01); *G06F 16/9024* (2019.01); *G06V 30/19093* (2022.01); *G06V 30/412* (2022.01)

(58) Field of Classification Search

CPC . G06F 16/215; G06F 16/9024; G06V 30/412; G06V 30/19093; G06Q 40/12

(Continued)

(56) References Cited

U.S. PATENT DOCUMENTS

| | | | |
|---|---|---|---|
| 6,963,885 | B2 | 11/2005 | Calkins |
| 9,183,173 | B2 | 11/2015 | Yih |

(Continued)

OTHER PUBLICATIONS

N. Augsten et al., “Similarity Joins in Relational Database Systems,” Synthesis Lectures on Data Management 5(5), 1-124 (2013), #3, 2013, 126 pages.

(Continued)

*Primary Examiner* — Shahid A Alam

(74) *Attorney, Agent, or Firm* — Baker Botts L.L.P.

(57) ABSTRACT

A computer-implemented method is disclosed. The method includes obtaining a candidate pair of a plurality of digitally stored documents from a document database. The method automatically computes relative positional differences between each digitally stored document of the candidate pair. The method compares the relative positional differences with a similarity function to form a difference similarity vector for the candidate pair. The difference similarity vector includes components corresponding to each relative positional difference. The method aggregates the components of the difference similarity vector to determine a final score for the candidate pair. The method determines a document-level similarity metric from the final score. The method determines whether the document-level similarity metric is above a threshold value and then classifies the candidate pair based on determining that the document-level similarity metric is above the threshold value to de-duplicate the plurality of digitally stored documents in the candidate pair.

16 Claims, 6 Drawing Sheets

Related U.S. Application Data

(60) Provisional application No. 63/483,357, filed on Feb. 6, 2023.

(51) Int. Cl.
*G06V 30/19* (2022.01)
*G06V 30/412* (2022.01)

(58) Field of Classification Search
USPC .......................................................... 707/692
See application file for complete search history.

(56) References Cited

U.S. PATENT DOCUMENTS

| | | | | |
|---|---|---|---|---|
| 11,595,685 | B2 | 2/2023 | Le Leannec | |
| 11,663,661 | B2 | 5/2023 | Hari Haran | |
| 2012/0047172 | A1 | 2/2012 | Ponte | |
| 2014/0279836 | A1 | 9/2014 | Yu | |
| 2016/0253350 | A1 | 9/2016 | Moulik | |
| 2017/0039198 | A1* | 2/2017 | Ramamurthy | G06F 16/904 |
| 2022/0188885 | A1 | 6/2022 | Blackman | |
| 2022/0237707 | A1 | 7/2022 | Hosoai et al. | |
| 2022/0245179 | A1* | 8/2022 | Dernoncourt | G06F 16/3329 |
| 2023/0098926 | A1 | 3/2023 | Balasubramanian | |
| 2024/0061883 | A1 | 2/2024 | Vadapandeshwara | |

OTHER PUBLICATIONS

I. Fellegi et al., "A Theory of Record Linkage," Proceedings of the International Symposium on Automation of Population Register Systems, A. B. 1967, vol. 1, 1967, Jerusalem, Israel. 29 pages. Reprinted with permission from the Journal of the American Statistical Association, American Statistical Association, Dec. 1969, vol. 64, No. 328, pp. 1183-1210, 29 pages.

D. Hirschberg, "Algorithms for the Longest Common Subsequence Problem," Princeton University, Princeton, New Jersey, Journal of the Association for Computing Machinery, Oct. 1977, pp. 664-675, vol. 24. No. 4, 12 pages.

H. Newcombe et al., "Record Linkage: Making Maximum use of the Discriminating Power of Identifying Information," Nov. 1, 1962, Communications of the ACM vol. 5, Issue 11, pp. 563-566, 4 pages.

G. Papadakis et al., "A Survey of Blocking and Filtering Techniques for Entity Resolution," arXiv:1905.06167v4 [cs.DB], vol. 1, No. 1, Article, Aug. 21, 2020, 38 pages.

L.A. Samoila, "Multiple Entity Reconciliation," KTH Royal Institute of Technology VionLabs, Stockholm, Sweden, 2015, 63 pages.

S.L. Lucio, "Supervised Record Linkage For Banking Reconciliations," Faculdade de Engenharia da Universidade Do Porto, Jan. 2021, 66 pages.

* cited by examiner 100
106 De-duplication Server
112 Control Insturctions
114 Exact Matching Instructions
116 Naive Fuzzy Matching Instructions
118 Target Fuzzy Matching Instructions
102 User Computer
104 User Computer
105
110 Transaction Documents
108 Document Database
140 Production Database
120 Entity Resolution Server
130 Transaction Processing System

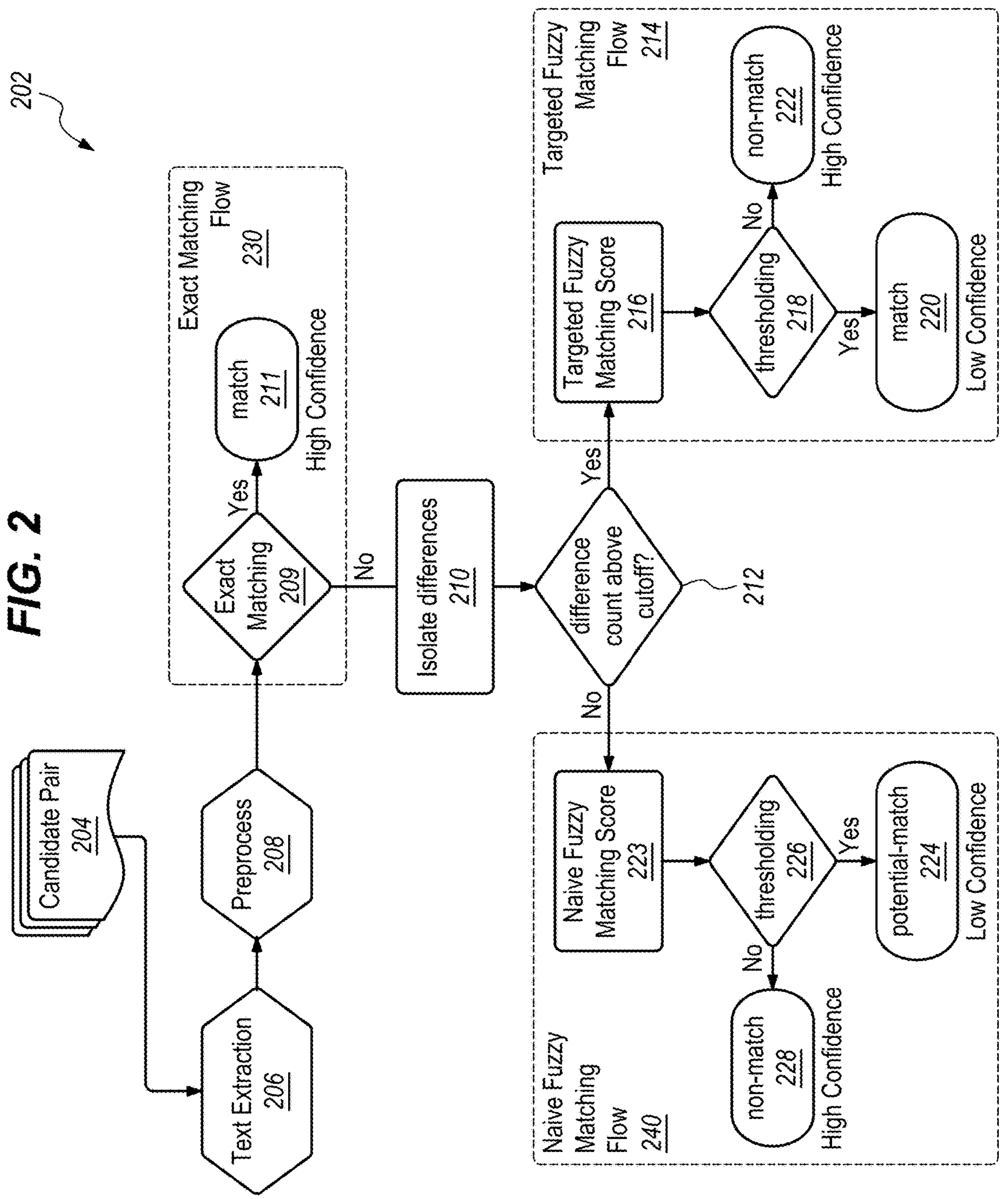
FIG. 2
202
Candidate Pair
204
Text Extraction
206
Preprocess
208
Exact Matching Flow
230
Exact Matching
209
Yes
match
211
High Confidence
No
Isolate differences
210
difference count above cutoff?
212
Yes
Targeted Fuzzy Matching Flow
214
Targeted Fuzzy Matching Score
216
thresholding
218
No
non-match
222
High Confidence
Yes
match
220
Low Confidence
No
Naive Fuzzy Matching Flow
240
Naive Fuzzy Matching Score
223
thresholding
226
Yes
potential-match
224
Low Confidence
No
non-match
228
High Confidence 302
DENJI COFFEE CORNER
234386 Lake Acenue
Salt Lake City, UTAH
888-888-(8888)
304
306
SALE
01/15/2023 11:30 AM TRAN: ZZSCLC5
XID: LGJY5XF2JQ80
XXXXXXXXXXX AMEX 7730
PRICE $ 20.25
SUBTOTAL $ 20.25
TAX $ 1.01
Total $ 21.26
THANK YOU FOR VISITING US
1622897213366655170
312
DENJI COFFEE CORNER
234386 Lake Acenue
Salt Lake City, UTAH
888-888-(8888)
SALE
01/17/2023 10:21 AM TRAN: JHUTUOL
316
XID: TKM1Y9EQRB40
XXXXXXXXXXX VISA 5688
PRICE $ 15.00
SUBTOTAL $ 15.00
TAX $ 0.75
Total $ 15.75
THANK YOU FOR VISITING US
314
88881501651778540

402
404
406
416
408
418
410
420
412
422
414
sale
01152023 1031
am tran
631mq83
xid
cf6gnpcxglko
xxxxxxxxx
amex 7730
price
sale
01172023 1021
am tran
jhutu01
xid
tkm1y9eqrb40
xxxxxxxxx
visa 5688
price FIG. 5
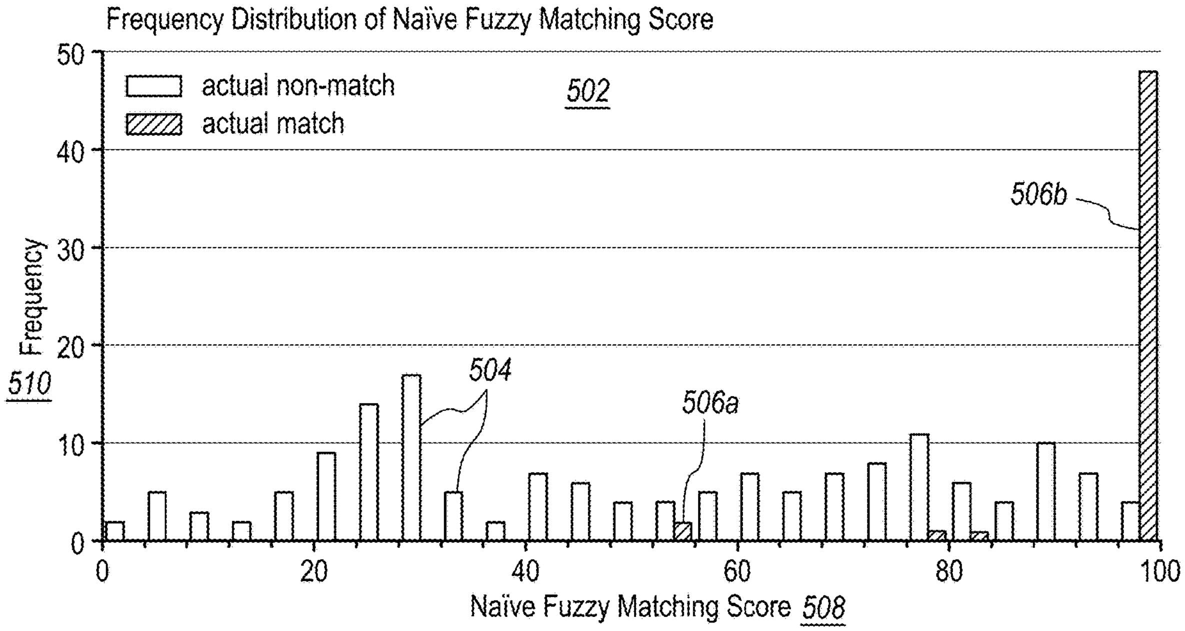
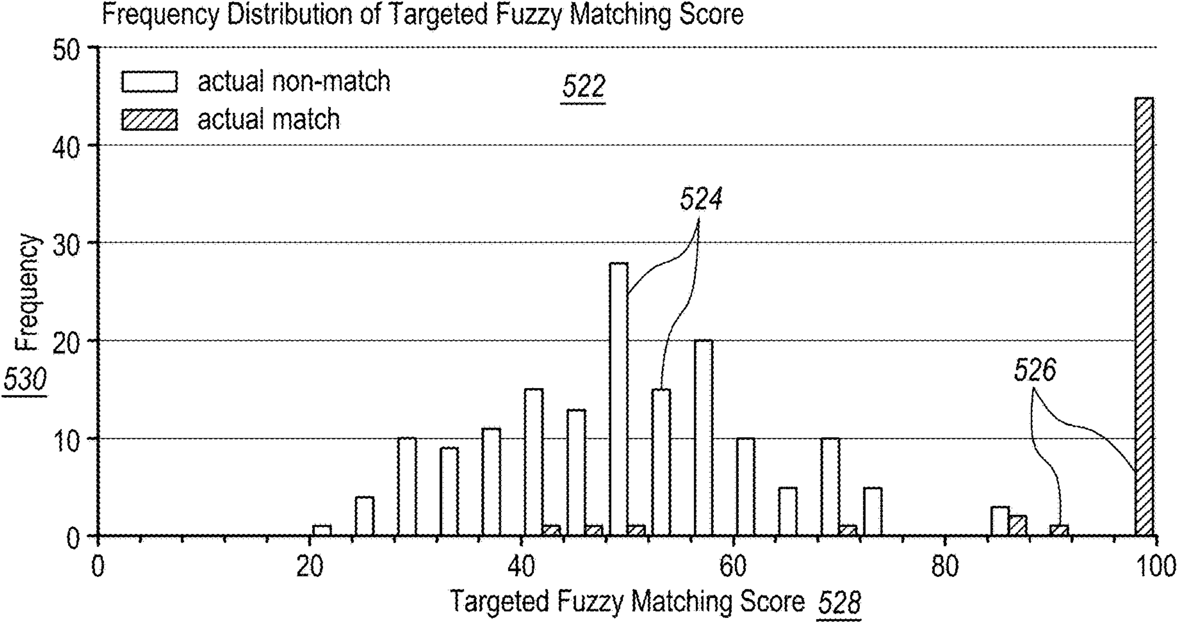

DE-DUPLICATING TRANSACTION RECORDS USING TARGETED FUZZY MATCHING

BENEFIT CLAIM

This application claims the benefit under 35 U.S.C. § 120 as a continuation of application Ser. No. 18/427,309, filed Jan. 30, 2024, which claims the benefit under 35 U.S.C. § 119 (e) of provisional patent application 63/483,357, filed Feb. 6, 2023, the entire contents of which are hereby incorporated by reference as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records but otherwise reserves all copyright or rights whatsoever. @ 2023 Coupa Software Incorporated.

TECHNICAL FIELD

One technical field of the present disclosure is de-duplicating records in computer-implemented automated transaction processing systems. Another technical field is artificial intelligence and machine learning as applied to matching transaction records.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Financial fraud detection is important to businesses around the world. Deduplicating financial records helps surface suspicious spending to auditors, prevents double spending, and saves valuable time by keeping auditors focused.

A robust and effective deduplication process is invaluable to the data quality and integrity of a business spend management system. Along with recorded tabular transactional data, financial documents, such as expense receipts and invoices, among many others, contain crucial information required to profile a transactional entity. Extraction techniques, such as Optical Character Recognition (OCR) or native text extraction (for proper PDFs), are employed to extract the raw content out of such documents, which is further processed and parsed to draw out useful information such as a merchant, a currency, spend date, amount, and various other fields. The recorded transactional data is either user-entered or supplemented by user-reviewed field extractions. Rule-based record linkage techniques aided by domain knowledge and multiple similarity joins have been employed to incorporate recorded transactional data into the deduplication process.

However, past approaches have not used the structural layout and relative positional differences in the content within documents of corresponding records in comparison to extracting information relevant to the deduplication. Based on the foregoing, the referenced technical fields have developed an acute need for robust incorporation and exploitation of the structural information residing within raw document extractions for the purpose of deduplication.

SUMMARY

The appended claims may serve as a summary of the invention.

BRIEF DESCRIPTION OF THE DRAWINGS

In the drawings:

FIG. 2 is a block diagram showing an example of data flow and process flow for a targeted fuzzy matching-based classifier according to one embodiment.

FIG. 5 is a two-part illustration of graphs to compare the targeted fuzzy matching approach and the naïve approach.

DETAILED DESCRIPTION

1. General Overview

Figure 1:
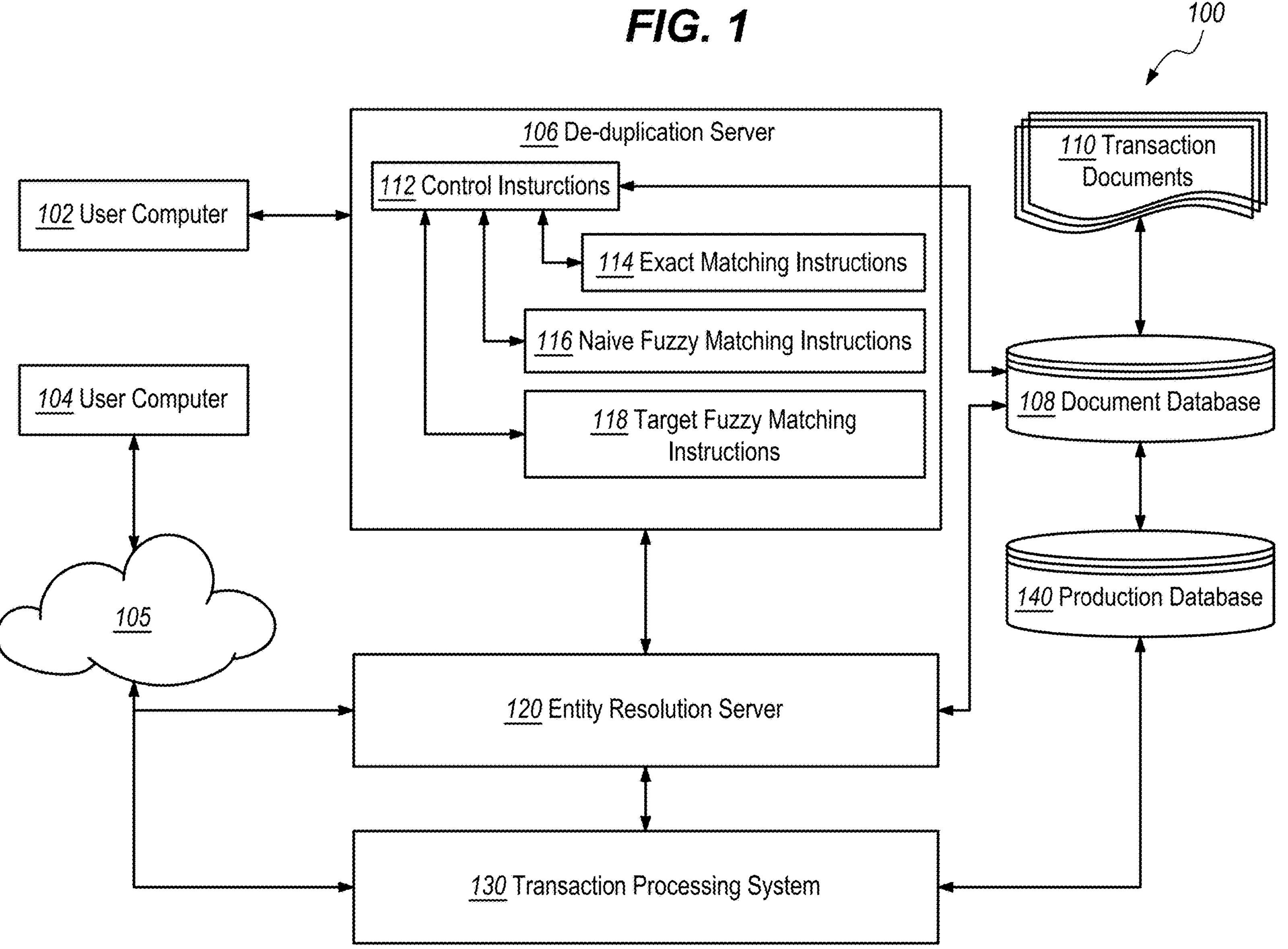
FIG. 1 illustrates a distributed computer system showing the context of use and principal functional elements with which one embodiment could be implemented.

Entity resolution, which can include record linkage and record deduplication, is the task of identifying and merging records sourced from two or more heterogeneous databases that refer to the same real-world entity. It is a core task of data integration, applicable to any kind of data, from the structured entities of relational databases to the semi-structured entities of linked data. Embodiments provide computer-implemented methods, systems, and computer-readable media programmed to determine a targeted fuzzy matching score for transaction records. The targeted fuzzy matching score has utility in deduplicating transactional records, such as expenses, purchase orders, invoices, and other documents, by making use of raw document extractions. The disclosure explores the properties and the utility of the targeted fuzzy matching score primarily as a technique for matching and filtering in association with record linkage.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis for interpreting the claims. Devices that are described as in communication with each other need not be in continuous communication with each other, unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to fully illustrate one or more aspects of the inventions. Similarly, although process steps, method steps, algorithms, or the like may be described in sequential order, such processes, methods, and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment, but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

2. Structural & Functional Overview

2.1 Distributed Computer System Example

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of deduplicating digitally stored electronic data records in a computer-implemented, automated transaction processing system. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In an embodiment, any number of user computers such as user computers 102, 104 are coupled to a de-duplication server 106, directly or indirectly via one or more data communication networks 105. Each of the user computers 102, 104 comprises any of a laptop computer, desktop computer, workstation, mobile computing device, or smartphone. Network 105 broadly represents any combination of one or more local area networks, wide area networks, campus networks, and/or internetworks, using any of wired or wireless, terrestrial or satellite network links.

In some embodiments, the de-duplication server 106 executes relatively autonomously under program control via programmatic calls to an application programming interface (API) or using remote procedure call (RPC) facilities, a message bus, or other means of inter-program communication. In these embodiments, the user computers 102, 104 can be omitted or have a more indirect, distant communication relationship to the de-duplication server 106.

In an embodiment, de-duplication server 106 comprises one or more server computers, desktop computers, server clusters, and/or one or more virtual compute instances and virtual storage instances in any of a premises computing facility, private data center, or public data center and/or cloud computing facility. Any computing device capable of programming to implement the functions described herein can serve as the de-duplication server 106.

In an embodiment, the de-duplication server 106 is communicatively coupled to a document database 108 that digitally stores a large number of transaction documents 110. In some embodiments, document database 108 stores on the order of ten million transaction documents 110. Examples of transaction documents 110 include electronic digital commercial invoices, statements, purchase orders, requisitions, and the like. Generally, the de-duplication server 106 is programmed to read transaction documents 110, identify likely duplicate transaction documents, and update the document database 108 to remove duplicate transaction documents. Removal of documents can comprise deleting records, marking records, updating column attributes, or writing records to a different table.

In some embodiments, the document database 108 is communicatively coupled to a production database 140, which is coupled to a transaction processing system 130, and optionally to an entity resolution server 120. The transaction processing system 130 can be programmed to instruct the document database 108 periodically to copy, update, or refresh records in production database 140 for use in other transaction processing, such as invoice approval chains, payment operations, and analytics. The entity resolution server 120, when present, can be programmed to perform entity resolution on the transaction documents 110; entity resolution or record linkage refers to identifying and disambiguating entities across different data sources from which the transaction documents 110 may have been obtained.

In an embodiment, the de-duplication server 106 comprises control instructions 112, exact matching instructions 114, naïve fuzzy matching instructions 116, and targeted fuzzy matching instructions 118. Each of the control instructions 112, exact matching instructions 114, naïve fuzzy matching instructions 116, and targeted fuzzy matching instructions 118 comprises one or more sequences of stored program control instructions that are digitally stored in a non-transitory storage medium, such as main memory, disk storage, or a virtual storage instances. In an embodiment, control instructions 112 are programmed to perform data extraction, preprocessing, invocation of other processing flows, test operations, and output or update operations. The exact matching instructions 114 are programmed to execute an exact matching processing flow. The naïve fuzzy matching instructions 116 are programmed to execute a naïve fuzzy matching processing flow. The targeted fuzzy matching instructions 118 are programmed to execute a targeted fuzzy matching processing flow. Examples of the processing flows are described further in other sections herein.

The architecture of FIG. 1 provides an improved data processing system capable of reading large numbers of transaction documents 110, detecting duplicate transaction documents among them, and updating the document database 108 to remove duplicates. Consequently, the total data storage required in document database 108 may be smaller, and later operations of entity resolution server 120 and/or transaction processing system 130 may be more efficient, faster, and require fewer CPU cycles, memory for storing records, and other computing resources.

Furthermore, the elimination of duplicates improves the accuracy of profiling entities and contributes to enhanced fraud detection in transaction processing.

2.2 Example Data Processing Flows

2.2.1 Process Overview

The terms "entity resolution" or "record linkage," and "deduplication," often are used interchangeably to refer to identifying and merging records that converge to the same real-world entity. However, the terms have a subtle difference. Entity resolution or record linkage generally refers to the broader process of identifying and disambiguating entities across different heterogeneous data sources. Deduplication, on the other hand, specifically refers to the process of identifying and removing duplicate records from a single dataset. All the frameworks and techniques used for entity resolution are applicable to deduplication. Deduplication is typically a simpler task than entity resolution, as it only involves matching records within a single dataset rather than across multiple sources.

In summary, deduplication refers specifically to the process of removing duplicate records within a single dataset or data source, while entity resolution refers to the process of identifying and disambiguating entities across multiple data sources. Deduplication is often a prerequisite to entity resolution. If the databases to be matched do not contain duplicate records, then the maximum possible number of true matches is limited by the size of the smaller of the two databases.

In an embodiment, record linkage comprises a two-step process. First, in a candidate selection step, potentially linkable records are identified for further scrutiny. Second, in a candidate matching step, the potentially linkable records are compared rigorously to decide whether the records are linked to the same entity. The first step helps tame the otherwise quadratic complexity of the entity resolution process, as every entity profile must be compared with all others. The second step can be further subdivided. In a first sub-step, termed record pair comparison, several attributes of each candidate record pair are compared to generate a comparison vector whose components are numerical similarity values corresponding to each attribute. Next, a record pair classification sub-step comprises a two-class (binary), or three-class classification task based on the comparison vector. The pairs are classified as matches or non-matches in the two-class case. Traditional probabilistic record linkage, such as the Fellegi-Sunter model of record linkage, considers a third class of potential matches where the classification outcome is unclear. Such record pairs with dubious linkages are subject to manual clerical review to determine the final match status.

FIG. 2 is a block diagram showing an example data flow and process flow for a targeted fuzzy matching-based classifier according to one embodiment.

In one embodiment, a trained machine learning classifier can be programmed based on targeted fuzzy matching as an independent record pair classifier with its own deduplication process. This deduplication process is only concerned with the document extraction attribute. FIG. 2 is a block diagram showing an example data flow and algorithm flow for a classifier according to one embodiment. FIG. 2 and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In an embodiment, process 202 is programmed as part of the targeted fuzzy matching instructions 118 (FIG. 1) based on the algorithmic or functional steps or blocks shown in FIG. 2. Each step or block shown in FIG. 2 can be programmed using one or more sequences of stored program instructions for execution using the computers of FIG. 1, FIG. 6. The process 202 initially receives a candidate pair 204 at text extraction instructions 206. The candidate pair 204 is selected, obtained, or retrieved from document database 108; techniques for selecting candidate electronic documents as the candidate pair are beyond the scope of this disclosure, and the specific candidate selection technique is not critical.

Figure 3:
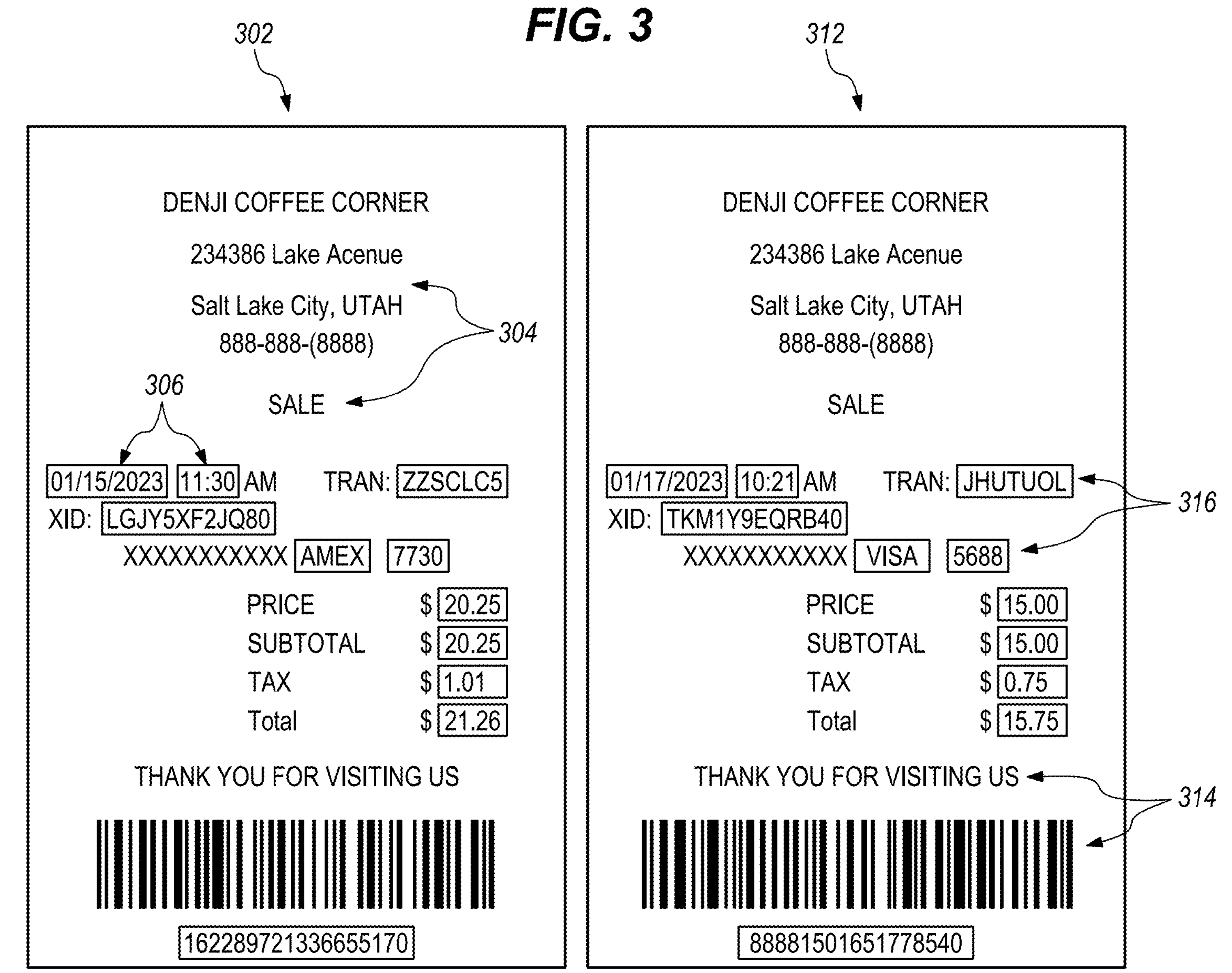
FIG. 3 illustrates an example pair of images of documents that have been generated based on a common template but having relative positional differences within bounding boxes.

In one embodiment, candidate pair 204 comprises a plurality of digitally stored documents. FIG. 3 illustrates an example pair of images of digitally stored documents that have been generated based on a common template but have relative positional differences within bounding boxes. In an embodiment, a first document 302 comprises a plurality of static text elements 304 and a plurality of dynamic elements 306. Similarly, a second document 312 comprises a plurality of static text elements 314 and a plurality of dynamic elements 316. It will be apparent that the substantive values of dynamic elements 306 are different from the values of dynamic elements 316, whereas the values of static text elements 304, 314 are the same. In embodiments, positional differences in images such as those of FIG. 3 can be extracted using efficient and scalable algorithms. For purposes of illustrating a clear example, FIG. 3 shows the first document 302 and the second document 312 in the form of point-of-sale receipts from a restaurant, but other embodiments can process any other digitally stored electronic documents and the specific content of the candidate documents to be compared is not critical.

Figure 4:
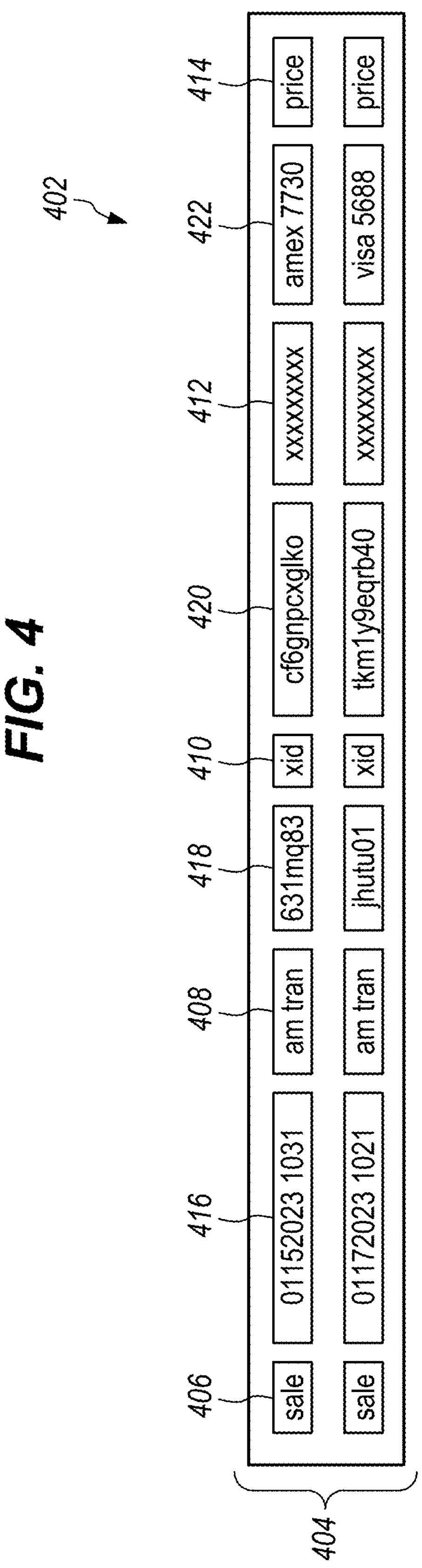
FIG. 4 illustrates a pair of linearized document extractions based on the documents of FIG. 3.

FIG. 4 illustrates a pair of linearized document extractions 404, based on the documents of FIG. 3. In FIG. 4, common elements 406, 408, 410, 412, 414 comprise static data values that were based on the common template. Different elements 416, 418, 420, 422 comprise image-specific or receipt-specific data values.

Thus, the relative positional differences are sandwiched between subsequent pairs of common parts of the document pair 402. Together, the common parts represent the common template of the document pair 402. The document extractions 404 can be preprocessed by linearizing them into a sequence of strings with no line breaks.

The common template is identified by finding the longest common subsequence (LCS) of the linearized document extractions 404. The problem of computing the LCS of two sequences is a classic, well-researched computer science problem with extensive applications in computer linguistics and bioinformatics. In an embodiment, the common template is identified with an optimal algorithm for reading out a LCS as described in D. S. Hirschberg "Algorithms for the longest common subsequence problem," J. ACM 24 (4), 664-675 (October 1977). Next, computing the positional differences count comprises isolating the content residing between two consecutive sub-components of the common template. The aggregate function essentially computes a weighted average where the weights are determined by a weighting function.

In an embodiment, an automated process is programmed to calculate and store a document similarity score based on the relative positional differences. In an embodiment, the process is programmed to isolate the differences between text extractions of each pair of documents. The inventors have discovered, in an inventive moment, that the differences between text extractions of each pair of documents are where actionable and identifying information resides. Next, the process is programmed to compare the differences with a desirable similarity function, resulting in a difference similarity vector having components corresponding to each positional difference. The vector components are combined using a specified aggregate function to produce a final score. In some embodiments, the final score may be termed a Targeted Fuzzy Matching Score 216, where "targeted" implies the act of targeting the positional differences. The final aggregate function essentially computes a weighted average where the weights are determined by a weighting function. Embodiments are programmed with code to implement the definitions specified next.

Definition 1. Given a collection of N linearized document extractions $\varepsilon$, such that $N=|\varepsilon|$, for a pair of linearized document extractions 404 $(\sigma_i, \sigma_j)\in\varepsilon\times\varepsilon$ with p being a substring of $\sigma_i$ and q being a substring of $\sigma_j$, the set of differences $D_{i,j}$ is given by $$\mathbb{D}_{i,j} = \{\langle p, q\rangle : \langle p, q\rangle \text{ is a difference par of } \langle \sigma_i, \sigma_j\rangle\} \tag{1}$$

Definition 2. Given the set of differences $D_{i,j}$ for a record pair, such that the count of differences $|D_{i,j}|\geq 2$, the targeted fuzzy matching similarity function $t: \varepsilon\times\varepsilon\rightarrow \mathbb{R}$ is defined as $$t(\sigma_i, \sigma_j) = \frac{\sum_{\langle p,q\rangle\in\mathbb{D}_{i,j}} \omega(p, q)\theta(p, q)}{\sum_{\langle p,q\rangle\in\mathbb{D}_{i,j}} \omega(p, q)} \tag{2}$$

where, with S being the set of all strings, $\Theta: S\times S\rightarrow R$ is the difference similarity function, and $w: S\times S\rightarrow R$ is the weighting function.

In an embodiment, determining the targeted fuzzy matching score 216 is programmed to yield a document-level similarity metric by aggregating individual similarity scores of every unique difference pair found. In one embodiment, the aggregate function models the document-level similarity score as a linear combination of difference-level similarity scores. In other embodiments, other aggregate functions that preserve the direct proportionality of the document-level similarity score to the individual difference-level similarity scores can be used.

The inventors have discovered that individual difference pair similarity scores, or simply difference scores, are weak approximators of the document-level similarity score, or simply the document score. The aggregation of the individual scores can cause the different scores to complement one another's weaknesses in approximating the document score. Therefore, the inventors have discovered that to calculate a reliable targeted fuzzy matching score, enough unique differences are required. In an embodiment, a hyperparameter value can specify a threshold or minimum number of unique differences required for the targeted fuzzy matching score 216 to be reliable. In an embodiment, the process is programmed to determine whether the targeted fuzzy matching score 216 for a document pair has a count of differences below the threshold value at block 212 and, in response, to declare the targeted fuzzy matching score 216 to be unreliable and to skip executing any further decision based on it. Such a targeted fuzzy matching score 216 has a low predictive capacity, and its overall utility as a similarity metric is diminished.

2.2.2 Error Processing

The inventors have discovered that the document extraction process can be error-prone; for example, minor typographical variations arising from OCR errors are likely to arise. More severe inconsistencies in extractions can be attributed to partial extractions, unsupported languages, bad image quality, inconsistent linearization of extractions, disordered document layout, and other factors. These extraction errors manifest themselves in the deduplication process and throw off any decision made based on such erroneous extractions. A process programmed to compute the targeted fuzzy matching score 216, yet having the inability to detect the presence of such errors and adjust accordingly, would have less power overall to distinguish between a match at block 220 and a non-match at block 222. Thus, embodiments should be programmed to understand the propagation of extraction errors and consequently determine the conditions under which the discriminative power of the document score is maximized.

In an embodiment, the process is programmed to calculate a similarity metric for the difference score computation based on edit-distance techniques. One characteristic of such metrics is that if a typographical error is introduced into either component of a difference pair, the magnitude of change in the score is inversely proportional to the collective size or cardinality of the difference pair. Using this observation, the weighting function can counter typographical variations by either penalizing or incentivizing the influence of the individual difference pairs in the computation of the document score via their respective weights. Embodiments can be programmed based on an assumption that the frequency of typographical errors is directly proportional to the size of the string. While this assumption may not match the attributes of all documents to be processed, it is sufficient to yield workable results. Although better modeling of the typographical inconsistencies could improve performance, the added complexity, coupled with an insignificant gain in performance, renders the pursuit uneconomical. Minor typographical errors from bad OCR predictions can be handled in this framework but more severe extraction errors, although relatively less frequent, are unpredictable and untenable.

While detecting severe extraction errors is challenging, the process can be programmed with one or more rules to detect severe distortions to extraction content. For example, the process can be programmed to compare the extraction sizes of two documents to be compared, because generally, documents with the same template have comparable extraction sizes.

2.2.3 Areas of Stability and High Confidence

Embodiments can be programmed to presume that a non-matching difference pair with low similarity is highly unlikely to yield a high similarity score upon introduction of typographical errors from the extraction process because typographical errors should be random and unorganized. For example, let ('apple', 'orange') be a non-matching difference pair. For this pair to match, the 'apple' must become an 'orange' or vice versa when any item of the pair is altered. Furthermore, both words can be simultaneously altered to make a match. The probability that a random process causes such highly specific alterations is practically negligible. Although the similarity score would be affected, the change is not likely to be significant enough to imply high similarity.

At to the document level, true non-matches, having been classified as non-matches in an idealistic scenario of perfect extractions, are highly likely to remain non-matches in the realistic scenario where noise in the form of typographical variations is prevalent. Class predictions based on targeted fuzzy matching scores are stable for non-matching document pairs. However, the converse is false; a pair of documents having a sufficiently high count of unique differences (above the threshold value at 212) and a highly targeted fuzzy matching score 216 (indicating high similarity) is highly likely to be a match. The introduction of noise in the form of typographical errors can easily reduce the high similarity score. This reduction can potentially overturn the predicted label from a match at block 220 to a non-match at block 222.

In summary, the similarity metric of embodiments, based on targeted fuzzy matching, provides stable, high-confidence predictions for the record pairs with actual non-match class in the face of extraction errors. Consequently, embodiments can effectively use a targeted fuzzy matching-based classifier in the record pair classification step, as further described in other sections herein.

2.2.4 Alternative Use Cases

Other sections herein describe a primary use case for the processes of this disclosure. Alternatively, targeted fuzzy matching scores as a similarity metric can be used as a filtering technique and as a match comparison or verification metric in the candidate matching step.

A filtering technique is a similarity join where entity pairs below a specified similarity threshold are removed from the set of potential candidates to be scrutinized in the record pair comparison step. Techniques used in this framework remove all true negatives while allowing some false positives. The targeted fuzzy matching metric can be potentially used in this framework. Because of the high computational cost associated with computing the targeted fuzzy matching score 216, its usage in later steps of the deduplication process, where the number of comparisons to be made is further reduced, becomes more reasonable and practically feasible.

Most similarity metrics are predominantly used for detailed match comparison. When used for this purpose, the targeted fuzzy matching score 216 will become one component of the comparison vector. Subsequently, the comparison vector is fed through to the record pair classification step to predict the match status. The targeted fuzzy matching score 216, being an overall unstable similarity metric (due to the various reasons previously stated), is ineffective as a traditional similarity metric in the record pair matching step. Furthermore, there is no context around the individual differences and their relative semantic importance is ignored in the computation of the final document score.

2.3 Integration with Classifier

Referring again to FIG. 2, in an embodiment, the text extraction instructions 206 are programmed to identify text elements within each candidate document of the candidate pair 204 and to store the text elements directly or as document extraction attributes using preprocess instructions 208. The resulting document extraction attributes can be serialized in the form seen in FIG. 3. Difference isolation instructions 210 then execute to isolate differences in the text elements and to yield a count of the number of differences. At block 212, a test is programmed to determine whether the difference count is above a cutoff value. If so, control transfers to a targeted fuzzy matching flow 214.

In the record pair comparison step, represented by targeted fuzzy matching flow 214, a single similarity score is calculated by comparing the document extraction attribute with a targeted fuzzy matching score 216 or metric. The resulting single valued similarity vector is the input to the final classifier. A threshold-based classification approach is programmed in embodiments, as represented by test at block 218. If the difference count is healthy (above the difference count threshold) and the similarity value is above a specified threshold, the pairs are classified to be matches at block 220 and otherwise as non-matches at block 222. But if the difference count does not exceed the threshold at block 212, the pairs are classified to be potential matches at block 224 in naïve fuzzy matching flow 240.

There are trivial cases where two sequences have no common subsequence. Such sequences do not have a common template and are non-matches. Thus, having no differences in the presence of a common template would result in the pair being a match, but if there is no common template itself, the pair would be a non-match.

2.3.1 Exact Matching

In rare cases, the same document is associated with two separate records. In most such cases, the document extractions are also identical. Therefore, in one embodiment, the process is programmed to execute an exact match comparison at block 209, as shown by exact matching flow 230, before executing the computationally expensive targeted fuzzy matching flow 214, to save some computational expense and make the overall process faster.

Document pairs with no differences are matches if a common template is present and are otherwise non-matches. Further, documents may have no common template and no differences. The former is a match shown at block 211 while the latter is a non-match. The exact matching step is used as a proxy to disambiguate between the two cases as it predicts the documents to be a match at block 211 and a non-match respectively.

2.3.2 Naïve Fuzzy Matching

In a naïve fuzzy matching flow 240, calculating a document-level similarity metric comprises applying an edit-distance-based string similarity function to the whole linearized document extractions. A score generated from the naïve fuzzy matching approach may have less discriminative power than a targeted fuzzy matching score 216. Consequently, a low tolerance threshold is required to compensate for the lower performance; the low tolerance threshold would be closer to the upper bound of the similarity score, thereby only allowing a small number of pairs to pass through. In an embodiment, the flow of FIG. 2 is programmed to classify the potential matches into non-matches if the naïve fuzzy matching score 223 is greater than the specified low tolerance threshold.

Including program instructions for naïve fuzzy matching flow 240 in the process of FIG. 2 is optional, and can be added to supplement a classification criteria when the difference count is below the corresponding specified threshold at block 212. In experiments, the inventors have found that a targeted fuzzy matching-based classifier has higher discriminative power by targeting the positional differences in the document extractions.

2.3.3 Integration with Primary Deduplication Process

In one embodiment, a score value or metric computed using a targeted fuzzy matching-based classifier, having high confidence predictions, can complement an existing traditional deduplication process without acting as a primary score value. For example, an embodiment can be programmed to combine a primary deduplication process with the targeted fuzzy matching-based classifier at the record pair classification step. Having identified finding actual non-matches as the high confidence area of the targeted fuzzy matching-based classifier, embodiments can be programmed to approximate such instances to be predicted non-matches, as the similarity score remains stable in the presence of minor typographical errors except for less frequent severe extraction errors.

In an embodiment, high-confidence non-match predictions from the targeted fuzzy matching-based classifier can overwrite the match status of the pairs which were classified as matches by a primary deduplication classifier. Thus, an embodiment can implement an ensemble of two classifiers that effectively supply ad hoc rule-based aggregation.

3. Results and Performance

The inventors programmed embodiments on an experimental basis, executed the embodiments, and created datasets to benchmark targeted fuzzy matching score values against naive fuzzy matching score values as baseline values, to compare the effectiveness of these approaches in discriminating between matches and non-matches in a threshold-based classification framework. The inventors also analyzed the holistic impact of the targeted fuzzy matching metric on the deduplication process. All the evaluations reported in this disclosure were performed on a randomly sampled and labeled set of 218 document pairs out of which 59 were true matches and the remaining 159 were true non-matches.

On a randomly sampled and labeled set of document pairwise comparisons, the inventors observed that the targeted fuzzy matching metric segregates actual matches and non-matches better than the naïve approach. The gain in segregation quality results in an increase in classification accuracy in a threshold-based classification framework.

FIG. 5 is a two-part illustration of graphs to compare the targeted fuzzy matching approach and the naïve approach. A first bar chart 502 illustrates a frequency distribution of score values calculated using the naïve fuzzy matching approach, in which first bars 504 indicate actual non-matches and second bars 506*a* and 506*b* indicate actual matches. A horizontal axis 508 represents score values of "0" (no match) to "100" (exact match), and the height of bars 504, 506*a*, 506*b* specifies the relative number or frequency of matches as indicated by the vertical axis 510.

A second bar chart 522 illustrates a frequency distribution of score values calculated using the targeted fuzzy matching approach, in which first bars 524 indicate actual non-matches and second bars 526 indicate actual matches. A horizontal axis 528 represents score values of "0" (no match) to "100" (exact match), and the height of bars 524, 526 specifies the relative number or frequency of matches as indicated by the vertical axis 530.

To assess overall performance gains when integrating the targeted fuzzy matching metric-based classifier with a primary deduplication process, the inventors programmed custom rule-based aggregation criteria. Under the constraints enforced by this criteria, only the non-match (negative class) predictions from the targeted fuzzy matching metric-based classifier take selective precedence over the corresponding match (positive class) predictions from the primary deduplication process. The targeted fuzzy matching metric-based classifier essentially prunes the false positives generated by the primary deduplication process at the expense of dropping a few true positives, thereby increasing the precision of the overall deduplication process, as seen in FIG. 5. In the experimental setting, the precision value increased from 27.06% to 46.82% using an ensemble with the targeted fuzzy matching metric-based classifier. The final classification is more precise than individual classifications, even more so in the case of the targeted fuzzy matching metric-based classifier.

3. Implementation Example—Hardware Overview

According to one embodiment, the techniques described herein are implemented by at least one computing device.

The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
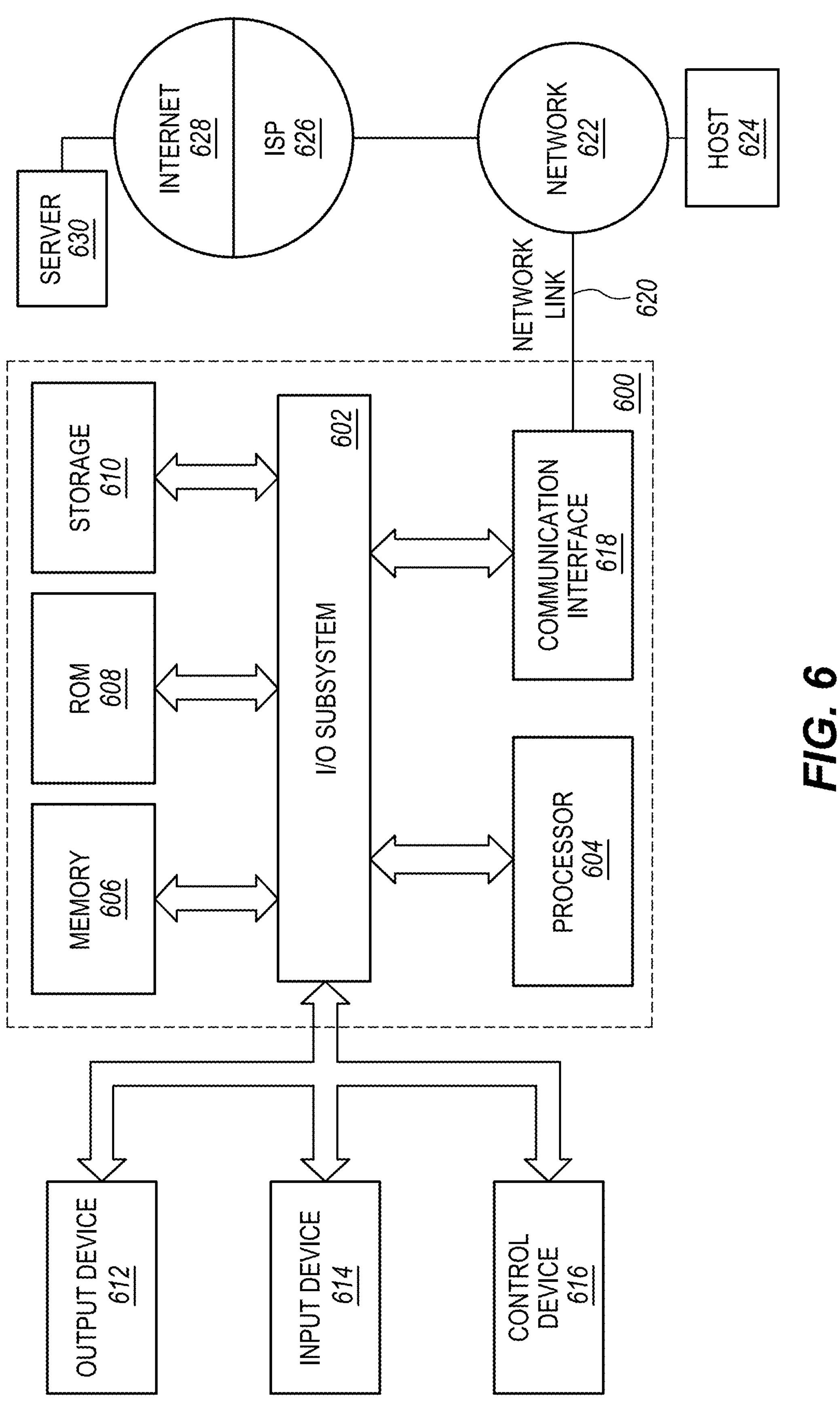
FIG. 6 illustrates a computer system with which one embodiment could be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608, or storage 610 may comprise one or more sets of instructions that are organized as modules, methods, objects, functions, routines, or calls. The instructions may be organized as one or more computer programs, operating system services, or application programs, including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host computer 624 or server computer 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to I/O subsystem 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server computer 630 broadly represents any computer, data center, virtual machine or virtual computing instance with or without a hypervisor, or computer executing a containerized program system such as DOCKER or KUBERNETES. Server computer 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server computer 630 may form elements of a distributed computing system that includes other computers, a processing cluster, server farm or other organization of computers that cooperate to perform tasks or execute applications or services. Server computer 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server computer 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
obtaining a candidate pair of a plurality of digitally stored documents from a document database;
automatically computing relative positional differences between each digitally stored document of the candidate pair;
comparing the relative positional differences with a similarity function to form a difference similarity vector for the candidate pair, wherein the difference similarity vector comprises components corresponding to each relative positional difference;
aggregating the components of the difference similarity vector comprising a weighted aggregation of similarity scores computed for content isolated between two consecutive sub-components of a common template of the candidate pair to determine a final score for the candidate pair by using a targeted fuzzy matching score based on the relative positional differences;
determining a document-level similarity metric from the final score;
determining whether the document-level similarity metric is above a threshold value;
classifying the candidate pair based by a targeted fuzzy matched-based classifier on determining that the document-level similarity metric is above the threshold value to de-duplicate the plurality of digitally stored documents in the candidate pair; and
excluding use of the targeted fuzzy matching score in response to determining that a count of the relative positional differences is below the threshold value.

2. The computer-implemented method of claim 1, further comprising, based on the classifying, removing duplicate transaction documents from the document database by any of deleting records, marking records, updating column attributes, or writing records to a different table.

3. The computer-implemented method of claim 1, further comprising:
identifying text elements from each digitally stored document in the candidate pair; and
storing the text elements as document extraction attributes.

4. The computer-implemented method of claim 3, further comprising:

determining whether the final score is above a cutoff value; and in response to determining that the final score for the candidate pair is above the cutoff value, comparing the document extraction attributes with the final score.

5. The computer-implemented method of claim 1, further comprising:

computing a document similarity score based on the relative positional differences; and aggregating document similarity scores of each difference in the candidate pair to determine the document-level similarity metric from the final score.

6. The computer-implemented method of claim 1, further comprising computing weights of the plurality of digitally stored documents in the candidate pair and computing a weighted average from the weights using a weighting function to determine the document-level similarity metric.

7. The computer-implemented method of claim 1, further comprising generating a pair of images of the candidate pair of the plurality of digitally stored documents based on a common template, wherein the pair of images comprises static data values of the candidate pair based on the common template having common elements between the candidate pair, and the relative positional differences comprises dynamic data values of the candidate pair.

8. The computer-implemented method of claim 7, further comprising:

preprocessing the plurality of digitally stored documents by linearizing into a sequence of strings with no line breaks;

performing a pair of linearized document extractions based on the plurality of digitally stored documents of the candidate pair;

identifying the common template by determining longest common sequence (LCS) of the pair of linearized document extractions; and computing the relative positional differences by isolating content between two consecutive sub-components of the common template.

9. One or more non-transitory computer-readable storage media, storing instructions which, when executed, cause one or more processors to execute:

obtaining a candidate pair of a plurality of digitally stored documents from a document database;

automatically computing relative positional differences between each digitally stored document of the candidate pair;

comparing the relative positional differences with a similarity function to form a difference similarity vector for the candidate pair, wherein the difference similarity vector comprises components corresponding to each relative positional difference;

aggregating the components of the difference similarity vector comprising a weighted aggregation of similarity scores computed for content isolated between two consecutive sub-components of a common template of the candidate pair to determine a final score for the candidate pair by using a targeted fuzzy matching score based on the relative positional differences;

determining a document-level similarity metric from the final score;

determining whether the document-level similarity metric is above a threshold value;

classifying the candidate pair based on determining that the document-level similarity metric is above the threshold value to de-duplicate the plurality of digitally stored documents in the candidate pair; and excluding use of the targeted fuzzy matching score in response to determining that a count of the relative positional differences is below the threshold value.

10. The one or more non-transitory computer-readable storage media of claim 9, storing instructions which, when executed, cause the one or more processors to execute, further comprising, based on the classifying, removing duplicate transaction documents from the document database by any of deleting records, marking records, updating column attributes, or writing records to a different table.

11. The one or more non-transitory computer-readable storage media of claim 9, storing instructions which, when executed, cause the one or more processors to execute, further comprising:

identifying text elements from each digitally stored document in the candidate pair; and storing the text elements as document extraction attributes.

12. The one or more non-transitory computer-readable storage media of claim 11, storing instructions which, when executed, cause the one or more processors to execute, further comprising:

determining whether the final score is above a cutoff value; and in response to determining that the final score for the candidate pair is above the cutoff value, comparing the document extraction attributes with the final score.

13. The one or more non-transitory computer-readable storage media of claim 9, storing instructions which, when executed, cause the one or more processors to execute, further comprising:

computing a document similarity score based on the relative positional differences; and aggregating document similarity scores of each difference in the candidate pair to determine the document-level similarity metric from the final score.

14. The one or more non-transitory computer-readable storage media of claim 9, storing instructions which, when executed, cause the one or more processors to execute, further comprising computing weights of the plurality of digitally stored documents in the candidate pair and computing a weighted average from the weights using a weighting function to determine the document-level similarity metric.

15. The one or more non-transitory computer-readable storage media of claim 9, storing instructions which, when executed, cause the one or more processors to execute, further comprising generating a pair of images of the candidate pair of the plurality of digitally stored documents based on a common template, wherein the pair of images comprises static data values of the candidate pair based on the common template having common elements between the candidate pair, and the relative positional differences comprises dynamic data values of the candidate pair.

16. The one or more non-transitory computer-readable storage media of claim 15, storing instructions which, when executed, cause the one or more processors to execute, further comprising:

preprocessing the plurality of digitally stored documents by linearizing into a sequence of strings with no line breaks;

performing a pair of linearized document extractions based on the plurality of digitally stored documents of the candidate pair;

identifying the common template by determining longest common sequence (LCS) of the pair of linearized document extractions; and computing the relative positional differences by isolating content between two consecutive sub-components of the common template.

* * * * *